United States Patent
Pomianowski et al.

(10) Patent No.: US 11,503,295 B2
(45) Date of Patent: *Nov. 15, 2022

(54) REGION-BASED IMAGE COMPRESSION AND DECOMPRESSION

(71) Applicant: Advanced Micro Devices, Inc., Santa Clara, CA (US)

(72) Inventors: Andrew S. Pomianowski, Bellevue, WA (US); Konstantine Iourcha, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,911

(22) Filed: May 15, 2020

(65) Prior Publication Data
US 2020/0280721 A1   Sep. 3, 2020

Related U.S. Application Data

(63) Continuation of application No. 15/845,252, filed on Dec. 18, 2017, now Pat. No. 10,659,784, which is a
(Continued)

(51) Int. Cl.
*G06K 9/36* (2006.01)
*H04N 19/124* (2014.01)
(Continued)

(52) U.S. Cl.
CPC ............. *H04N 19/124* (2014.11); *G06T 9/00* (2013.01); *H04N 19/119* (2014.11);
(Continued)

(58) Field of Classification Search
CPC ....................................................... G06T 9/00
See application file for complete search history.

(56) References Cited

U.S. PATENT DOCUMENTS 5,144,423 A    9/1992  Knauer et al.
5,604,824 A    2/1997  Chui et al.
(Continued)

FOREIGN PATENT DOCUMENTS

EP    0725363 A2 *  8/1996  ............. G06T 9/007
EP    0 785 688 A2   7/1997
(Continued)

OTHER PUBLICATIONS

Space-Frequency Quantization for Image compression with Directionlets, Vladan Velisaavljevic et al., IEEE, 2007, pp. 1761-1773 (Year: 2007).*

(Continued)

*Primary Examiner* — Jayesh A Patel
(74) *Attorney, Agent, or Firm* — Volpe Koenig

(57) ABSTRACT

An apparatus for encoding an image and an apparatus for decoding an image are presented. An image contains one or more regions. For encoding the image, the image is decomposed into one or more regions and a region is evaluated to determine whether the region meets a predetermined compressions acceptability criteria. The region is then encoded in response to the transformed and quantized region meeting the predetermined compression acceptability criteria. For decoding the image, a region of the image is selected and the selected region is decoded using metadata associated with the selected region. The metadata includes transformation quantization settings and information describing an aspect ratio used to compress the region.

19 Claims, 5 Drawing Sheets

Related U.S. Application Data continuation of application No. 14/683,279, filed on Apr. 10, 2015, now Pat. No. 9,848,192, which is a continuation of application No. 13/651,020, filed on Oct. 12, 2012, now Pat. No. 9,025,899.

(60) Provisional application No. 61/547,648, filed on Oct. 14, 2011.

(51) Int. Cl.

| | | |
|---|---|---|
| *H04N 19/119* | (2014.01) | |
| *H04N 19/46* | (2014.01) | |
| *H04N 19/196* | (2014.01) | |
| *H04N 19/122* | (2014.01) | |
| *H04N 19/96* | (2014.01) | |
| *H04N 19/12* | (2014.01) | |
| *H04N 19/17* | (2014.01) | |
| *H04N 19/194* | (2014.01) | |
| *G06T 9/00* | (2006.01) | |
| *H04N 19/587* | (2014.01) | |
| *H04N 19/60* | (2014.01) | |
| *H04N 19/146* | (2014.01) | |
| *H04N 19/154* | (2014.01) | |
| *H04N 19/10* | (2014.01) | |

(52) U.S. Cl.
CPC ............ *H04N 19/12* (2014.11); *H04N 19/122* (2014.11); *H04N 19/17* (2014.11); *H04N 19/194* (2014.11); *H04N 19/196* (2014.11); *H04N 19/46* (2014.11); *H04N 19/587* (2014.11); *H04N 19/60* (2014.11); *H04N 19/96* (2014.11); *H04N 19/10* (2014.11); *H04N 19/146* (2014.11); *H04N 19/154* (2014.11)

(56) References Cited

U.S. PATENT DOCUMENTS

| | | | |
|---|---|---|---|
| 6,044,115 A | 3/2000 | Horiike et al. | |
| 6,185,253 B1 | 2/2001 | Pauls | |
| 6,396,958 B1 | 5/2002 | Wilson | |
| 6,532,308 B1 | 3/2003 | Goertzen | |
| 6,856,701 B2 | 2/2005 | Karczewicz et al. | |
| 7,206,448 B2 | 4/2007 | Howard | |
| 8,000,540 B2* | 8/2011 | Ahn | H04N 19/70 382/233 |
| 8,774,539 B2* | 7/2014 | Arai | H04N 13/161 382/233 |
| 8,805,106 B2* | 8/2014 | Han | H04N 19/48 382/250 |
| 8,855,195 B1* | 10/2014 | Kelly | G06T 1/00 375/240.01 |
| 9,025,899 B2* | 5/2015 | Pomianowski | H04N 19/119 382/233 |
| 9,848,192 B2* | 12/2017 | Pomianowski | H04N 19/96 |
| 10,659,784 B2* | 5/2020 | Pomianowski | H04N 19/96 |
| 2002/0094127 A1 | 7/2002 | Mitchell | |
| 2002/0143556 A1 | 10/2002 | Kadatch | |
| 2003/0021486 A1 | 1/2003 | Archarya | |
| 2004/0013202 A1 | 1/2004 | Lainema | |
| 2004/0126029 A1* | 7/2004 | Sakuyama | H04N 19/70 375/E7.198 |
| 2005/0025246 A1* | 2/2005 | Holcomb | H04N 19/70 375/240.03 |
| 2005/0025369 A1 | 2/2005 | Shah | |
| 2005/0063562 A1 | 3/2005 | Brunk | |
| 2005/0123282 A1* | 6/2005 | Novotny | H04N 19/70 375/E7.199 |
| 2005/0175092 A1 | 8/2005 | Puri | |
| 2005/0276323 A1 | 12/2005 | Martemyanov et al. | |
| 2006/0018382 A1 | 1/2006 | Shi | |
| 2007/0189621 A1 | 8/2007 | Liu | |
| 2007/0242749 A1 | 10/2007 | Sung | |
| 2008/0037656 A1 | 2/2008 | Hannuksela | |
| 2008/0055331 A1* | 3/2008 | Iourcha | H04N 19/119 375/E7.176 |
| 2008/0084927 A1* | 4/2008 | Rosenzweig | H04N 19/172 375/E7.145 |
| 2008/0117966 A1 | 5/2008 | Topiwala et al. | |
| 2009/0016624 A1 | 1/2009 | Sung | |
| 2009/0180550 A1* | 7/2009 | Park | H04N 19/46 375/E7.027 |
| 2009/0190654 A1 | 7/2009 | Shimazaki et al. | |
| 2010/0226441 A1 | 9/2010 | Tung | |
| 2011/0142137 A1* | 6/2011 | Leigh | H04N 19/63 375/240.18 |
| 2011/0412137 | 6/2011 | Leigh et al. | |
| 2012/0176487 A1 | 7/2012 | Pinard | |
| 2013/0083845 A1 | 4/2013 | Yu et al. | |
| 2014/0037223 A1 | 2/2014 | Jiang | |
| 2014/0177706 A1* | 6/2014 | Fernandes | H04N 19/59 375/240.03 |
| 2014/0184636 A1* | 7/2014 | Kelly | G06T 9/00 345/619 |
| 2014/0307781 A1 | 10/2014 | He | |
| 2015/0133214 A1 | 5/2015 | Heath | |
| 2015/0172726 A1* | 6/2015 | Faramarzi | H04N 19/132 375/240.24 |
| 2016/0094859 A1* | 3/2016 | Tourapis | H04N 19/865 348/43 |

FOREIGN PATENT DOCUMENTS

| | | | | |
|---|---|---|---|---|
| EP | 2 360 928 A1 | | 8/2011 | |
| EP | 2360928 A1 | * | 8/2011 | ............ H04N 19/13 |
| JP | H02-84895 A | | 3/1990 | |
| JP | 3526316 B2 | * | 5/2004 | |
| JP | 2010-035189 A | | 2/2010 | |
| JP | 2013518463 A | * | 5/2013 | |
| KR | 10-0355375 B1 | | 12/2002 | |
| KR | 100696451 B1 | * | 3/2007 | |
| KR | 10-2010-0005224 A | | 1/2010 | |
| WO | 2008027413 A2 | | 3/2008 | |
| WO | WO-2011087963 A1 | * | 7/2011 | ............ G06T 5/004 |
| WO | WO-2011090790 A1 | * | 7/2011 | ........... H04N 19/119 |
| WO | 2011/125313 A1 | | 10/2011 | |

OTHER PUBLICATIONS

A JPEG Variable Quantization method for Compound Documents, Konstantinos Konstantinides et al., IEEE, 2000, pp. 1282-1287 (Year: 2000).*

The JPEG2000 Still Image Coding System: an Overview, Charilaos Christopoulos et al., IEEE, Aug. 30, 2000, pp. 1103-1127 (Year: 2000).*

Kim, I.K., et al., "Rate-distoration optimization of the image compression algorithm based on the warped discrete cosine transform," Signal Proceesing, vol. 83, No. 9, Sep. 2003, Elsevier B.V. (10 pages).

Han, W.J., "Improved Video Compression Efficiency Through Flexible Unit Representation and Corresponding Extension of Coding Tools," IEEE Transactions on Circuits and Systems for Video Technology, vol. 20, No. 12, Dec. 2010 (12 pages).

"Fast mode decision and motion estimation for JVT/H.264", Proceedings, 2003 International Conference on Image Processing, 2003. ICIP 2003, vol. 3, Sep. 17, 2003, pages III-853-III-856.

"Improved Video Compression Efficiency Through Flexible Unit Representation and Corresponding Extension of Coding Tools", IEEE Transactions on Circuits and Systems for Video Technology, vol. 20, Issue 12, Dec. 1, 2010, pp. 1709-1720.

* cited by examiner

500

REGION-BASED IMAGE COMPRESSION AND DECOMPRESSION

CROSS REFERENCE TO RELATED APPLICATIONS

This application is a continuation of U.S. patent application Ser. No. 15/845,252, filed Dec. 18, 2017, which is a continuation of U.S. patent application Ser. No. 14/683,279, filed Apr. 10, 2015, which issued on Dec. 19, 2017 as U.S. Pat. No. 9,848,192, which is a continuation of U.S. patent application Ser. No. 13/651,020, filed Oct. 12, 2012, which issued on May 5, 2015 as U.S. Pat. No. 9,025,899, which claims the benefit of U.S. Provisional Patent Application No. 61/547,648, filed Oct. 14, 2011, the contents of which are hereby incorporated by reference as if fully set forth herein.

FIELD OF INVENTION

The present invention is generally directed to image compression and in particular, to a method for region-based image compression.

BACKGROUND

Lossy compression techniques require methods to effectively encode images at lower bit rates without sacrificing significant image quality. Fixed rate compression schemes generally have poor image quality at rates significantly below four bits per pixel. Some existing variable rate compression techniques, like Joint Photographic Experts Group (JPEG), apply some form of transform and quantization.

Some methods of reducing the amount of data to be stored after compression may involve storing the data in a sparse manner and interpolating the results. Existing methods generally have not provided good levels of image quality, and in some cases, may also introduce potentially undesired image artifacts (e.g., high frequency noise).

SUMMARY OF EMBODIMENTS

Adding a local per-region transform and quantization step before subsequent compression steps may reduce the amount of data to be compressed, thereby reducing the required bit rate needed to maintain a high level of image quality. During decompression, a reconstruction transformation is applied to generate the pixel values. Overall, performing a per-region transform and quantization permits better tradeoffs to be made in attaining low bit rates with high image quality, without adding unmanageable complexity to the image decoding.

Some embodiments provide a method for decompressing an image, the image including one or more regions. A region of the image is selected to be decoded. The region and metadata associated with the region are decoded, the metadata including transformation and quantization settings used to compress the region. A reconstruction transformation is applied to the region using the transformation and quantization settings.

Some embodiments provide a non-transitory computer-readable storage medium storing a set of instructions for execution by a general purpose computer to decompress an image, the image including one or more regions. The set of instructions includes a selecting code segment, a decoding code segment, and an applying code segment. The selecting code segment selects a region of the image to decode. The decoding code segment decodes the region and metadata associated with the region, the metadata including transformation and quantization settings used to compress the region. The applying code segment applies a reconstruction transformation to the region using the transformation and quantization settings.

Some embodiments provide a method for decompressing an image, the image including one or more regions, each region including one or more subregions. A region of the image is selected to be decoded, and a subregion of the selected region is selected to be decoded. The subregion and metadata associated with the subregion are decoded, the metadata including transformation and quantization settings used to compress the subregion. A reconstruction transformation is applied to the subregion using the transformation and quantization settings.

Some embodiments provide a non-transitory computer-readable storage medium storing a set of instructions for execution by a general purpose computer to decompress an image, the image including one or more regions, each region including one or more subregions. The set of instructions includes a first selecting code segment, a second selecting code segment, a decoding code segment, and an applying code segment. The first selecting code segment selects a region of the image to decode. The second selecting code segment selects a subregion of the region to decode. The decoding code segment decodes the subregion and metadata associated with the subregion, the metadata including transformation and quantization settings used to compress the subregion. The applying code segment applies a reconstruction transformation to the subregion using the transformation and quantization settings.

BRIEF DESCRIPTION OF THE DRAWINGS

A more detailed understanding may be had from the following description, given by way of example in conjunction with the accompanying drawings, wherein.

DETAILED DESCRIPTION

Fixed-rate block-based compression techniques require methods to effectively encode images at low bit rates without sacrificing significant image quality. Adding a local per-region transform and quantization step in front of any subsequent encoding and/or compression steps reduces the amount of data to be encoded and/or compressed to retain image quality while achieving a desired target bit rate. To decompress the region, the compressed data may first be fully or partially decompressed according to the underlying compression scheme (depending on the implementation). The reconstruction transformation is then applied to produce the approximation to the original uncompressed data. If any coefficients were discarded during quantization, those coefficients are assumed to be zero for the purposes of the reconstruction transformation.

Figure 1:
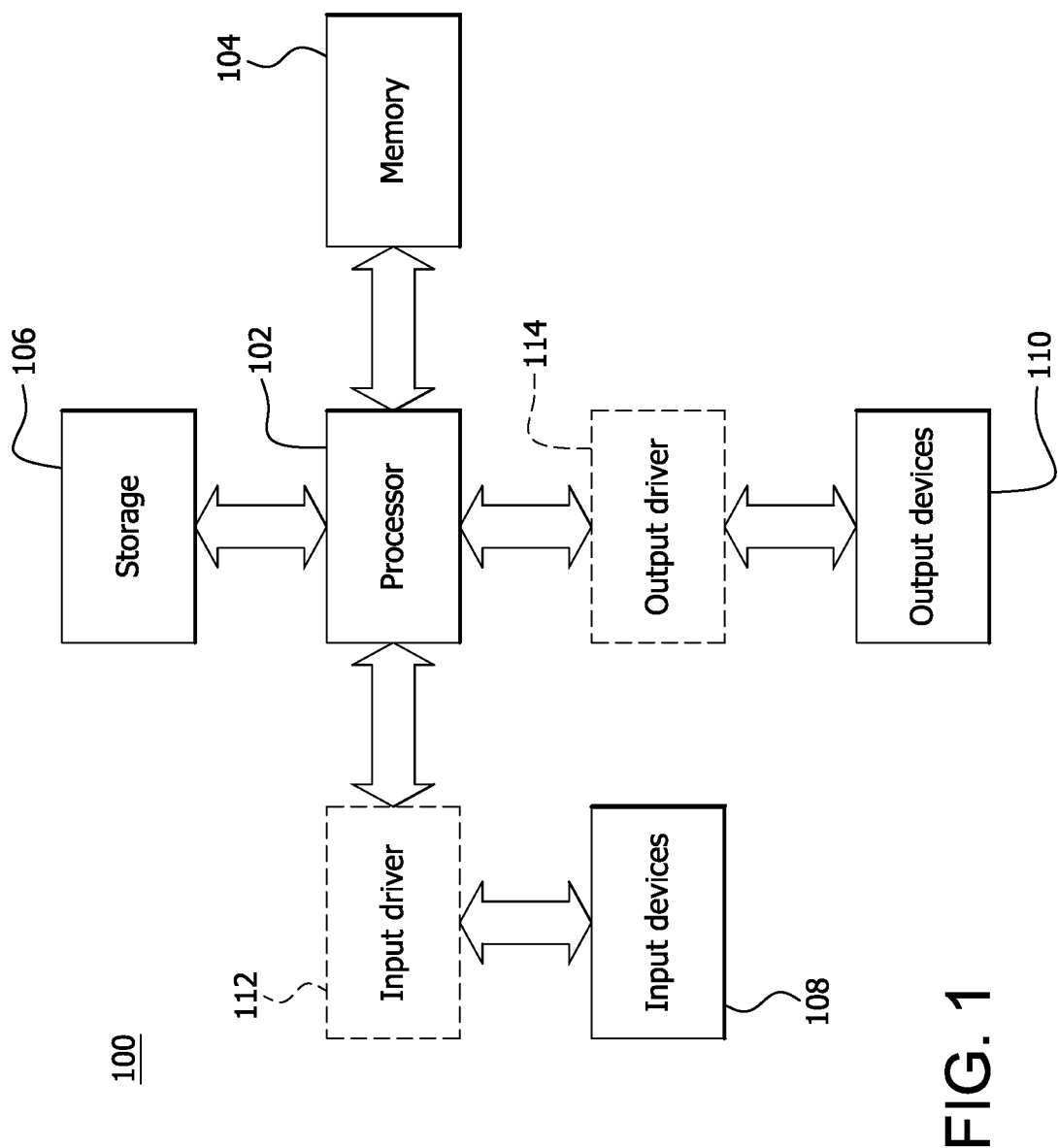
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
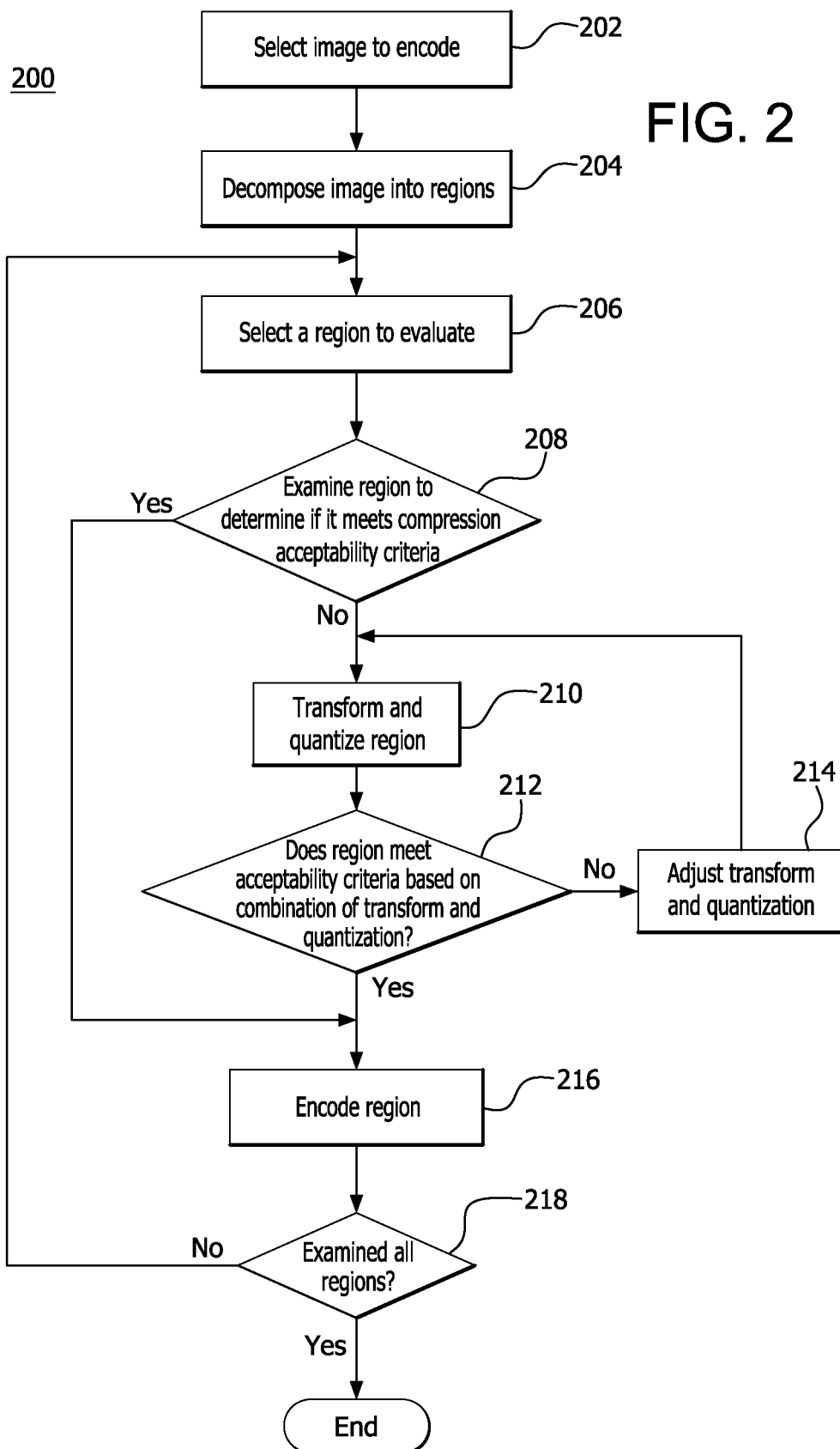
FIG. 2 is a flow chart of a method for compressing an image.

FIG. 2 is a flow chart of a method 200 for compressing an image. An image to be encoded is selected (step 202) and the selected image is decomposed into several regions according to a predetermined method (step 204). The regions may be a fixed size or a variable size, and the decomposing method may be hierarchical. It is noted that the particular method used to decompose the image into regions does not affect the overall operation of the method 200.

A region is selected for evaluation (step 206) and is examined to determine if the region meets a predetermined compression acceptability criteria (step 208). The predetermined compression acceptability criteria may include, but is not limited to, a specific bit rate, a specific image quality, or combinations thereof. It may be possible to encode the region to meet the predetermined compression acceptability criteria using the basic underlying compression system. In this case, no additional transform and quantization step is required, and the region can be processed directly in the encoding stage. This may be viewed as a special case where the transform is the identity transform.

If the region does not meet the predetermined compression acceptability criteria (step 208), then several refinements may be performed. The region is transformed and quantized (step 210). If the method determines that the region needs to be transformed and quantized to satisfy predefined compression acceptability criteria, then the method selects the transform and quantization from a predefined set. In one embodiment, the set may include only linear transforms, for example filtering with a smoothing kernel, wavelet transforms, curvelet transforms, Gabor wavelet transforms, etc. In another embodiment, the set may include non-linear transforms.

As part of its optimization procedure, the encoder may evaluate multiple potential combinations of transform and quantization, selecting the combination that achieves the highest quality at the predetermined compression acceptability criteria. The encoder may have parameters to control the extent of any optimization steps at this stage to tradeoff overall compression quality against encoding performance. These controls may limit the extent of the search for optimal transforms and quantizations, and may also provide threshold values, permitting the technique to exit early when certain targets are reached.

Quantization is performed by taking the coefficients output from the transform and rounding them to a predefined set of values, and the set may be different for each coefficient. In some embodiments, sets of the values corresponding to some of the coefficients may consist of a single value of zero, which means that the corresponding coefficients are discarded (such as in downsampling). After quantization, the remaining coefficients are encoded.

It is then determined whether the region meets the predetermined compression acceptability criteria based on a combination of transform and quantization (step 212). If the region does not meet the predetermined compression acceptability criteria, then the transform and quantization settings may be adjusted (step 214) and the adjusted region is transformed and quantized with the adjusted settings (step 210).

After optimizing the transformation and quantization, and the region meets the predetermined compression acceptability criteria or all candidate settings have been evaluated and the best settings are chosen (steps 208 or 212), the region is encoded (step 216). The encoding may incorporate some underlying compression. For each region, the output data format includes some metadata to be stored and/or transmitted with the region, to indicate the transform and the quantization applied for that region and other information that may be required for decoding. In addition, the encoded region may be transmitted (not shown in FIG. 2). If all of the regions of the image have not been examined (step 218), then the method continues by selecting another region to evaluate (step 206). If all of the regions of the image have been examined (step 218), then the method terminates.

In a specific implementation of the method 200 (not shown), the transform and quantization in step 210 may be configured to be a downscaling operation. A region that is to be compressed is evaluated and downscaled with a selected aspect ratio (which encompasses the transform and quantization) prior to compression, to reduce the total number of pixels in the region while retaining as much of the information as possible. Performing the downscaling reduces the amount of data prior to encoding, allowing the encoding (which may include additional compression steps) to occur with a higher accuracy for a given bit rate. One of a set of different aspect ratios may be selected for downscaling the region. The selected aspect ratio provides the best results according to a selected error metric (for example, peak signal to noise ratio) by evaluating the results of quantizing to each possible ratio against this metric for the current region.

In one implementation, the target bit rate is known (for example, in a fixed-rate compression scheme), and the amount of space available at the target bit rate can be calculated. With this information, there may be multiple ways a region could be scaled to fit in the available space. During downscaling, some of the high-frequency image information is discarded, effectively blurring the region. Depending on the content of the original region, the choice of the scaling aspect ratio may have a significant impact on preserving the image quality. By applying a non-uniform scaling to the original data, more of the important information in the original image can be preserved. By having a different level of scaling for each region, the compression can respond to local characteristics in the image content for different regions. The implementation may potentially examine multiple possible choices of transform and quantization for each region in the image to optimize the predetermined compression acceptability criteria.

Figure 3:
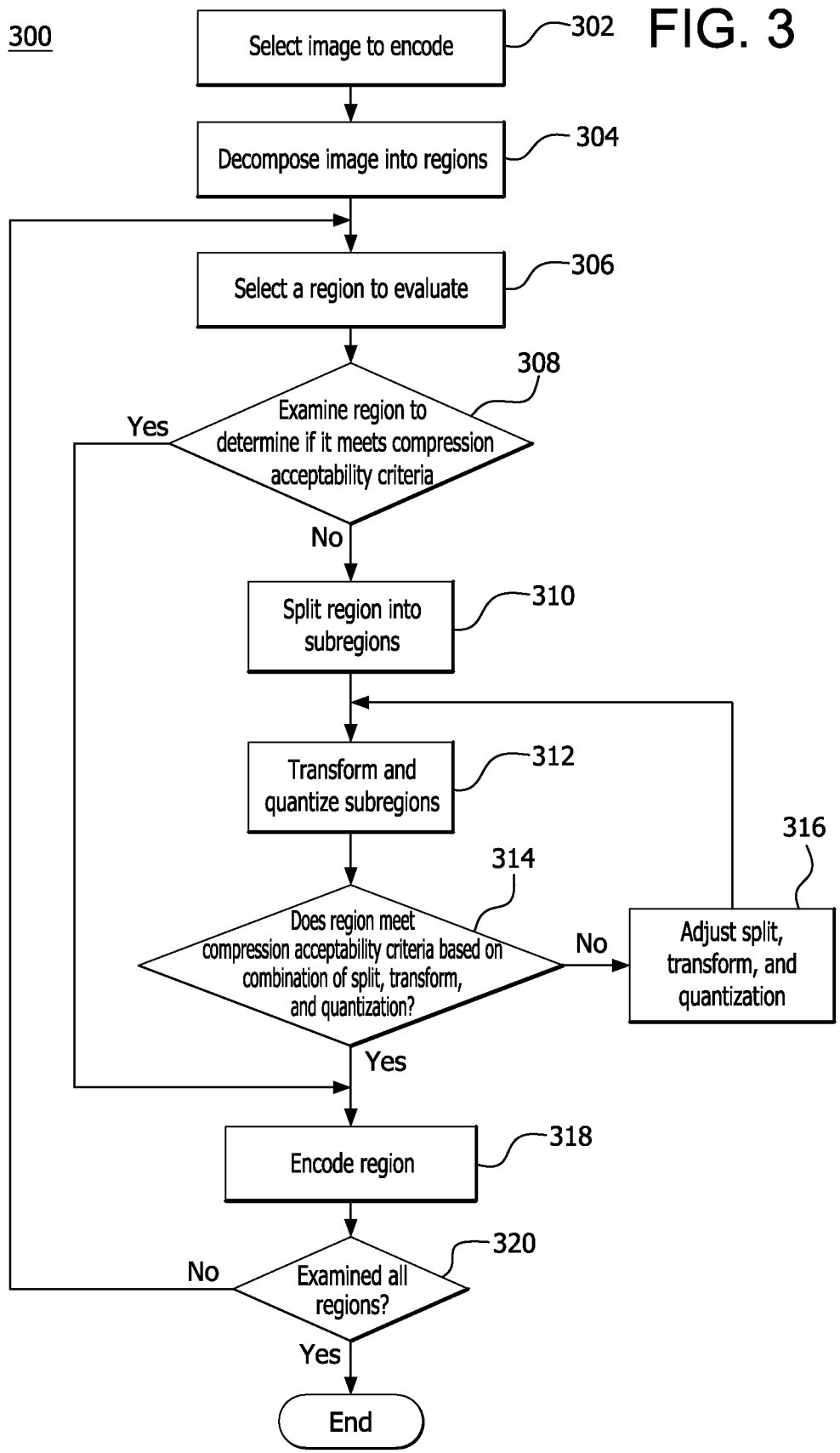
FIG. 3 is a flow chart of an alternate method for compressing an image.

FIG. 3 is a flow chart of an alternate method 300 for compressing an image. An image to be encoded is selected (step 302) and the selected image is decomposed into several regions according to a predetermined method (step 304). The regions may be a fixed size or a variable size, and the decomposing method may be hierarchical. It is noted that the particular method used to decompose the image into regions does not affect the overall operation of the method 300.

A region is selected for evaluation (step 306) and is examined to determine if the region meets a predetermined compression acceptability criteria (step 308). The predetermined compression acceptability criteria may include, but is not limited to, a specific bit rate, a specific image quality, or combinations thereof. It may be possible to encode the region to meet the predetermined compression acceptability criteria using the basic underlying compression system. In this case, no transform and quantization step is required, and the region can be processed by the underlying compression scheme. This may be viewed as a special case where the transform is the identity transform.

If the region does not meet the predetermined compression acceptability criteria (step 308), then several refinements may be performed. The region is split into subregions (step 310), and the subregions are transformed and quantized (step 312). If the encoder determines that the region needs to be split, transformed, and quantized to satisfy the predetermined compression acceptability criteria, then the encoder selects a split, transform, and quantization from a set of predefined splits, transforms, and quantizations. In one embodiment, the set may include only linear transforms, for example filtering with a smoothing kernel, wavelet transforms, curvelet transforms, Gabor wavelet transforms, etc. In another embodiment, the set may include non-linear transforms.

As part of its optimization procedure, the encoder may evaluate multiple potential combinations of region split (how the region is split into subregions), transform, and quantization, selecting the combination that achieves the highest quality to meet the predetermined compression acceptability criteria. The encoder may have parameters to control the extent of any optimization steps at this stage to tradeoff overall compression quality against encoding performance. These controls may limit the extent of the search for optimal regions, subregion splits, transforms, and quantizations, and may also provide threshold values, permitting the technique to exit early when certain targets are reached.

It is then determined whether the region meets the predetermined compression acceptability criteria based on a combination of split, transform, and quantization (step 314).

If the region does not meet the predetermined compression acceptability criteria, then the split (how the region is split into subregions), transform, and/or quantization may be adjusted (step 316) and the adjusted subregions are transformed and quantized (step 312) based on the adjustment(s). If the split is adjusted (step 316), a different splitting technique may be used to generate alternative region splits that may result in achieving the predetermined compression acceptability criteria.

After optimizing the region split, transformation, and quantization, and the region meets the predetermined compression acceptability criteria and/or other termination conditions for this processing (steps 308 or 314), the region is encoded (step 318). The encoding may incorporate some underlying compression. For each region, the output data format includes some metadata to be stored and/or transmitted with the region, to indicate the region split, the transform, and the quantization applied for that region and other information that may be required for decoding. In addition, the encoded region may be transmitted (not shown in FIG. 3). If all of the regions of the image have not been examined (step 320), then the method continues by selecting another region to evaluate (step 306). If all of the regions of the image have been examined (step 320), then the method terminates.

Figure 4:
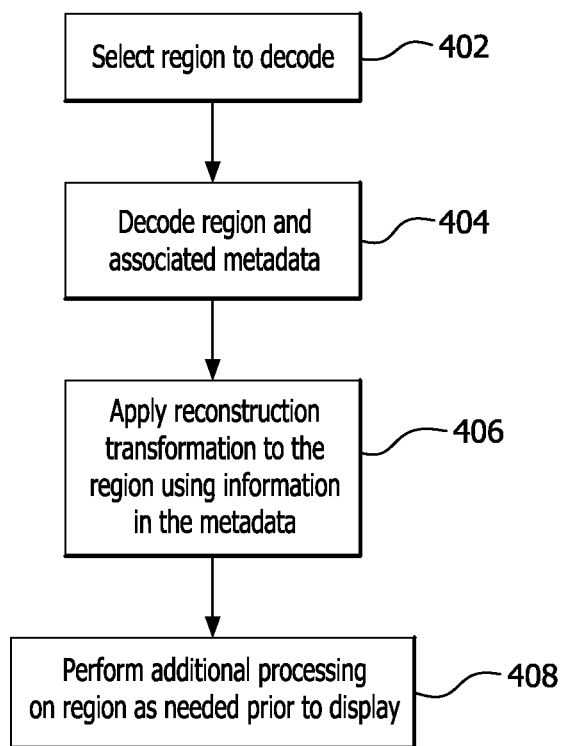
FIG. 4 is a flow chart of a method for decompressing a region of an image.

FIG. 4 is a flow chart of a method 400 for decompressing a region of an image. A region of the image is selected for decoding (step 402), and the selected region and its associated metadata are decoded (step 404). A reconstruction transformation is applied to the region using information included in the metadata (step 406). Additional processing is then performed on the region as needed prior to displaying the image (step 408). Examples of the additional processing may include, for example, texture mapping operations, etc.

In an alternate embodiment of the method 400 (not shown) the region may be split into subregions. The subregions may share a single transform and quantization (specified for the whole region), or each subregion may have its own individual transform and quantization specified.

In an alternate embodiment of the method 400 (not shown), step 406 may be an upscaling operation, if the region was downscaled during encoding. The data is expanded according to the underlying compression method for the region. The region is then upscaled using information included in the metadata describing the aspect ratio used for the downscaling (step 406). The upscaling may use any applicable filter, but to preserve image quality, the encoder needs to know what filter will be used by the decoder, as this allows the compression quality to be tuned more precisely. In a hardware implementation, the upscaling filter may be bilinear, because this filter is simple and cheap to implement. Other types of upscaling filters may be used without substantially altering the operation of the method 400. In addition, the type of filter used for upscaling may be uniform over the entire image or may be selected independently for each region of the image.

In one implementation of this embodiment, the encoder uses a fixed-rate region-based compression scheme with a given region size, e.g., 8×8. Each region is compressed independently. If it is not possible to encode every pixel in the region explicitly at the required bit rate, then the region is downscaled by a predetermined ratio prior to compression. For example, the 8×8 region may be reduced in size to 8×6, which would reduce the amount of pixel information that needs to be stored by 25%. The level of information reduction is chosen to allow the region to be encoded at the desired compression acceptability criteria. The downscaling may be accomplished by any appropriate method, with higher quality methods being used to retain more useful information.

For a given amount of final information, there may be several different ways of scaling the region to reduce the amount of information that needs to be stored by a similar amount. For example, 8×6, 7×7, and 6×8 sets of pixels all require approximately the same amount of final data to encode. For each region, the encoder may try different ratios, and use the ratio that provides the best image quality in terms of the predetermined compression acceptability criteria (selecting from the multiple different quantizations).

In some regions of the image, it is noted that the method may choose to use a higher level of downscaling (e.g., 8×5, 8×4, 6×5, etc.) and evaluate these ratios in conjunction with the encoder using back-end compression schemes that have a lower compression rate. By reducing the number of unique pixels that need to be stored, the remaining pixels may be encoded with a higher accuracy (i.e., a lower compression rate), while achieving the same predetermined compression acceptability criteria. In smooth regions of an image, it may be advantageous to use these higher levels of downscaling while encoding the final pixels at higher precision. Conversely, in some regions (for example, those regions with more high-frequency content), it may be more optimal in terms of image quality to use minimal or no scaling (quantization), and instead use a higher rate of back-end compression.

One extension to this embodiment is to downsample information along a selected vector direction, to preserve more of the image quality in the region (rather than the approximation achieved using downsampling aligned to the X and Y axes but with a variable aspect ratio). In this case, the quantization could be the same as above, but the transform is now different. This extension may allow better preservation of detail in regions of the image where the high frequency content is aligned closer to the diagonals. For example, if an image can be downscaled with knowledge of the direction of motion in the image (if any), then the high-frequency information orthogonal to the direction of the motion can be retained, while other information may be discarded.

A second extension to this embodiment is to subdivide the original region further into subregions, and independently scale each subregion (select a different transform and quantization for each subset) to better match the characteristics of the region to provide a higher image quality.

Figure 5:
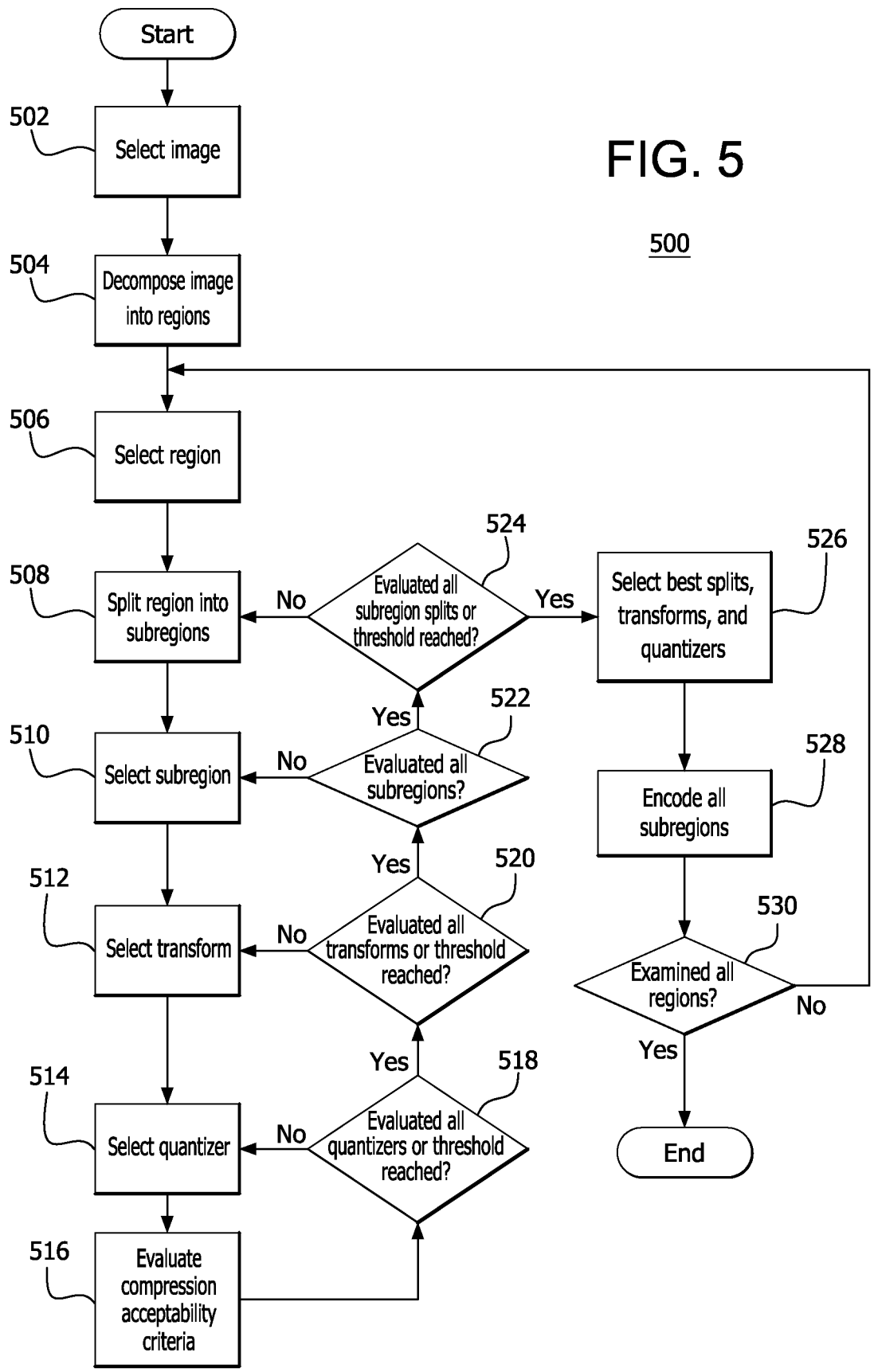
FIG. 5 is a flow chart of a method for compressing an image that evaluates combinations of transforms and quantizers.

FIG. 5 is a flow chart of a method 500 for compressing an image that evaluates combinations of regions, subregions, transforms, and quantizers. An image to be encoded is selected (step 502) and the selected image is decomposed into regions (step 504). A region of the image is selected (step 506). To evaluate the selected region of the image, the selected region is split into subregions (step 508), a subregion is selected (step 510), a transform is selected (step 512), and a quantizer is selected (step 514). Based on the selected subregion, transform, and quantizer, the selected subregion of the image is processed and evaluated to determine whether it meets predetermined compression acceptability criteria (step 516). It is noted that the selection of the split (step 508), transform (step 512), and quantizer (step 514) may be performed in any order without affecting the overall operation of the method 500. Optionally, the compression acceptability criteria that are determined by the selected subregion split, transform, and quantizer may be stored for later comparison.

To ensure that the best possible combination of split, transform, and quantizer are chosen for the selected region, all of the splits, transforms, and quantizers will be evaluated. It should be understood that in an optimized embodiment, the method may not exhaustively enumerate all combinations of region split, subregion split, transform, and quantizer, but may use an optimized search approach to produce the same or similar result.

If all of the quantizers have not been evaluated or a threshold compression acceptability criteria has not been reached (step 518), then another quantizer is selected (step 514) and processing continues as described above. If all of the quantizers have been evaluated or if the threshold compression acceptability criteria has been reached (step 518), then a determination is made whether all of the transforms have been evaluated or the threshold compression acceptability criteria has been reached (step 520).

If all of the transforms have not been evaluated or the threshold compression acceptability criteria has not been reached (step 520), then another transform is selected (step 512) and processing continues as described above. If all of the transforms have been evaluated or the threshold compression acceptability criteria has been reached (step 520), then a determination is made whether all subregions have been evaluated (step 522).

If all of the subregions of the region have not been evaluated (step 522), then another subregion of the region is selected (step 510) and processing continues as described above. If all of the subregions have been evaluated (step 522), then a determination is made whether all of the subregion splits have been evaluated or the threshold compression acceptability criteria has been reached (step 524).

If all of the subregion splits have not been evaluated and the threshold compression acceptability criteria has not been reached (step 524), then the region is split into different subregions (step 508) and processing continues as described above. In an alternative embodiment (not shown), the threshold compression acceptability criteria defined in steps 518, 520, and 524 may not be used.

After all combinations of splits, transforms, and quantizers have been evaluated or the threshold compression acceptability criteria for the selected region has been reached, the best splits, transforms, and quantizers are selected (step 526). All of the subregions of the region are encoded using the best subregion splits, transforms, and quantizers (step 528). In one implementation, the encoding in step 528 may also include additional compression. For each region, the output data format includes some metadata to be stored and/or transmitted with the region, to indicate the subregion splits, transforms, and quantizers applied for that region and other information that may be required for decoding.

Next, a determination is made whether all of the regions of the image have been examined (step 530). If all of the regions of the image have not been examined, then another region of the image is selected (step 506) and processing continues as described above. If all of the regions of the image have been examined (step 530), then the method terminates.

Other embodiments are possible, where the transformation and quantization are tightly coupled with the final encoding, and also with the implementation of the decoding. In addition to the following two examples, other embodiments are possible.

In a first example embodiment, texture filtering operations will be performed on the decoded data, so an upscaling filter may be implemented by manipulating the texture filtering hardware, rather than by implementing an additional dedicated upscaler.

In a second example embodiment, the underlying compression (encoding) generates index coefficients that are used to select colors. In this case, the transformation and quantization may be performed on the index coefficients produced by the underlying encoder, rather than on the original color data. In this embodiment, the region is compressed prior to the region being transformed and quantized.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An apparatus for compressing an image, comprising:
   an encoder configured to:
      decompose the image into a plurality of regions including a first region, a second region, and a third region;
      evaluate each region of the plurality of the regions to determine whether the region meets a predetermined compression acceptability criteria;
      in response to the first region meeting the predetermined compression acceptability criteria, encoding the first region; and
      in response to the second region and the third region not meeting the predetermined compression acceptability criteria:
         transform and quantize the second region and the third region to generate a transformed and quantized second region and a transformed and quantized third region;
         determine whether the transformed and quantized second region and the transformed and quantized third region meet the predetermined compression acceptability criteria;
         in response to the transformed and quantized second region meeting the predetermined compression acceptability criteria, encode the second region; and
         in response to the transformed and quantized third region not meeting the predetermined compression acceptability criteria:
            adjust transformation and quantization settings; and
            transform and quantize the third region using the adjusted settings; and
            in response to the transformed and quantized third region using the adjusted settings meeting the predetermined compression acceptability criteria, encode the third region.

2. The apparatus according to claim 1, wherein the have a fixed size and shape.

3. The apparatus according to claim 1, wherein the plurality of regions have a variable size and shape.

4. The apparatus according to claim 1, wherein the encoder is further configured to implement the transform and quantization by performing a downscaling operation of the region with a selected aspect ratio.

5. The apparatus according to claim 4, wherein the encoder is further configured to:
   compress each region after downscaling using a fixed or variable bit rate compression scheme.

6. The apparatus according to claim 1, wherein the encoder is further configured to store metadata with the encoded first region, the metadata indicating the transformation and quantization applied for the first region.

7. An apparatus for compressing an image, comprising:
   an encoder configured to:
      decompose the image into a plurality of regions including a first region, a second region, and a third region;
      evaluate each of the plurality of regions to determine whether the each region meets a predetermined compression acceptability criteria;
      in response to the first region meeting the predetermined compression acceptability criteria, encoding the first region; and
      in response to the second region and the third region not meeting the predetermined compression acceptability criteria:
         split the second region into second subregions and the third region into third subregions;
         transform and quantize the second subregions and the third subregions to generate split, transformed, and quantized second subregions and split, transformed, and quantized third subregion;
         determine whether the split, transformed, and quantized second subregions and the split, transformed, and quantized third subregions meet the predetermined compression acceptability criteria based on a combination of subregion split, transform, and quantization;
         in response to the split, transformed, and quantized second region meeting the predetermined compression acceptability criteria, encode the second region; and
         in response to the split, transformed, and quantized third subregions not meeting the predetermined compression acceptability criteria:
            adjust any one or a combination of subregion split, transformation, and quantization settings for the third region to produce updated split, transformed, and quantized third subregions; and transform and quantize the updated split, transformed, and quantized third subregions using the adjusted settings; and in response to the updated split, transformed, and quantized third subregions using the adjusted settings meeting the predetermined compression acceptability criteria, encode the third region.

8. The apparatus of claim 7, wherein each of the plurality of regions has a fixed size and shape.

9. The apparatus of claim 7, wherein each of the plurality of regions has a variable size and shape.

10. The apparatus of claim 7, wherein the encoder is further configured to implement the transform and quantization by performing a downscaling operation of the region with a selected aspect ratio.

11. The apparatus according to claim 10, wherein the encoder is further configured to compress each region after downscaling using a fixed or variable bit rate compression scheme.

12. The apparatus according to claim 7, wherein the encoder is further configured to store metadata with the encoded first region, the metadata indicating the transformation and quantization applied for the first region.

13. An apparatus for compressing an image, comprising:
an encoder configured to:
decompose the image into a first region and a second region;
select a first subregion split, a first transform, and a first quantizer for the first region and a second subregion split, a second transform, and a second quantizer for the second region;
evaluate the first region and the second region to determine whether the first subregion split, the first transform, the first quantizer, the second subregion split, the second transform, and the second quantizer meet a predetermined compression acceptability criteria;
in response to the first subregion split, the first transform, and the first quantizer meeting the predetermined compression acceptability criteria, encode the region; and
in response to the second subregion split, the second transform, and the second quantizer not meeting the predetermined compression acceptability criteria:
evaluate any one or a combination of the second subregion split, the second transform, and the second quantizer;
adjust any one or a combination of the second subregion split, the second transform, and the second quantizer to generate an adjusted second subregion split, an adjusted second transform, and a second quantization setting; and
in response to the adjusted second subregion split, the adjusted second transform, and the second quantizer meeting the predetermined compression acceptability criteria, encode the second region.

14. The apparatus of claim 13, wherein the encoder is further configured to implement the transform and quantization by performing a downscaling operation with a selected aspect ratio.

15. An apparatus for decompressing an image, comprising:
a decoder configured to:
select a region of the image to decode, wherein the image includes one or more regions;
decode the selected region using metadata associated with the selected region, wherein the metadata includes transformation and quantization settings and information on an aspect ratio; and
apply a reconstruction transformation to the selected region using the transformation and quantization settings, wherein applying the reconstruction transformation includes performing an upscaling operation to the selected region using the information on the aspect ratio.

16. The apparatus of claim 15, wherein decoding the selected region includes decoding multiple subregions of each selected region.

17. The apparatus of claim 16, wherein each subregion of a particular region shares the same transform and quantization.

18. The apparatus of claim 16, wherein, within the region, one subregion includes a first transform and a first quantization and a second region includes a second transform different from the first transform and a second quantization different from the first quantization.

19. The apparatus of claim 15, further comprising performing additional processing on the selected region prior to display, wherein the additional processing includes a texture mapping operation.

* * * * *